US005785792A

United States Patent [19]

Locke et al.

[11] Patent Number: 5,785,792

[45] Date of Patent: Jul. 28, 1998

[54] METHOD FOR MAKING A DECORATIVE PANEL FOR USE IN SCREEN DOORS, WINDOWS, AND SIMILAR STRUCTURES

[75] Inventors: Albert C. Locke, Gardena; Oscar Schoenfeld, Beverly Hills, both of Calif.

[73] Assignee: Academy Manufacturing Co., Inc., Gardena, Calif.

[21] Appl. No.: 730,776

[22] Filed: Oct. 16, 1996

Related U.S. Application Data

[62] Division of Ser. No. 410,972, Mar. 27, 1995, abandoned.

[51] Int. Cl.[6] .............................. B32B 31/00; B41M 1/26; B05D 5/00; B41C 1/14

[52] U.S. Cl. .............................. 156/247; 156/277; 427/243; 101/128.4

[58] Field of Search .............................. 160/371, DIG. 7; 40/621, 616; 101/129, 128.21, 128.4; 156/247, 277; 427/243, 247

[56] References Cited

U.S. PATENT DOCUMENTS

| | | | |
|---|---|---|---|
| 243,962 | 7/1881 | Palmer | 160/DIG. 7 |
| 2,281,635 | 5/1942 | Strauss | 160/DIG. 7 |
| 2,624,967 | 1/1953 | Phillippi | 101/129 X |
| 3,017,927 | 1/1962 | Demko | 160/DIG. 7 |
| 3,577,915 | 5/1971 | Thompson et al. . | |
| 5,518,803 | 5/1996 | Thomas | 428/195 |
| 5,525,177 | 6/1996 | Ross | 156/240 |
| 5,534,098 | 7/1996 | Kerle | 156/230 |

*Primary Examiner*—David A. Simmons
*Assistant Examiner*—J. A. Lorengo
*Attorney, Agent, or Firm*—Freilich, Hornbaker & Rosen

[57] ABSTRACT

A panel for use in a screen door comprising an air permeable essentially visually transparent substantially open mesh material bearing a layer of plastic material thereon forming a decorative pattern.

6 Claims, 4 Drawing Sheets

METHOD FOR MAKING A DECORATIVE PANEL FOR USE IN SCREEN DOORS, WINDOWS, AND SIMILAR STRUCTURES

This application is an Divisional of U.S. patent application 08/410,972, filed Mar. 27, 1995 now abandoned.

BACKGROUND OF THE INVENTION

This invention relates to decorative, air permeable, visually transparent panels for use in screen doors and the like and to a method of manufacture thereof.

Screen doors and the like, e.g., window screens, are widely used in residential and commercial buildings for providing a visually transparent opening and allowing air flow therethrough while preventing insect entry. Such screen doors typically include a substantially rigid frame defining an open area and a panel of flexible substantially open mesh material stretched across that area. The mesh material is typically formed of orthogonal fibers, e.g., aluminum or fiber glass, which are spaced substantially uniformly in both directions to define a matrix of rectangular openings. For example, a mesh material widely used in screen doors employs fibers having a diameter of 0.011 inches with 18 vertical (WOOF) and 16 horizontal (WARP) fibers per inch. These parameters define a substantially open mesh (i.e., more than 50% open) thus affording good visual access and air permeability. The resulting mesh openings, e.g., approximately 0.05 inch square, are sufficiently small to define an effective boundary against most flying insects.

Prior art attempts to apply decorative patterns to mesh material have included painting a pattern on the surface of the mesh material fibers. Such a procedure does not produce an aesthetically pleasing result. Another attempt (e.g., U.S. Pat. No. 314,483) involves fully covering the mesh material with a solid film and then applying the decorative pattern to the film. This approach would not be useful in connection with screen doors which necessitate that the mesh material be air permeable and visually transparent.

SUMMARY OF THE INVENTION

The present invention is directed to a panel suitable for use in a screen door comprised of an air permeable, visually transparent, substantially open mesh material bearing a decorative pattern affixed thereto.

In a preferred embodiment, the panel is comprised of flexible mesh material formed of intersecting fibers dimensioned and spaced to define a matrix of mesh openings, which openings comprise at least 50% of the material area. A substantially planar layer of plastic material, defining a decorative pattern, is affixed to the mesh material with the plastic material at least partially surrounding portions of multiple ones of the fibers. The plastic material is preferably solid and thus non-permeable to air but the decorative pattern typically occupies only a small percentage of the panel thus retaining the panel's essential characteristics of air permeability and visual transparency.

More particularly, the invention is directed to a screen door having a substantially rigid frame defining an open area bridged by a panel of substantially open mesh material bearing a layer of plastic material thereon forming a decorative pattern.

In accordance with a preferred method of manufacture, successive panels of mesh material (which can be in continuous web form) are moved through a print station between a print head and platen. A layer of release material, e.g., a treated smooth surface paper, is placed between the mesh material and the platen. The print head is preferably capable of dispensing a thermal setting plastic ink through a fine printing screen and stencil system onto the open mesh material. After the plastic ink is deposited onto the mesh material against the release material, it is thermally cured in place. This leaves a set layer of plastic material secured to the mesh material. After peeling away the release material, the mesh material is mounted in a screen door frame in a conventional manner.

DETAILED DESCRIPTION

Figure 1:
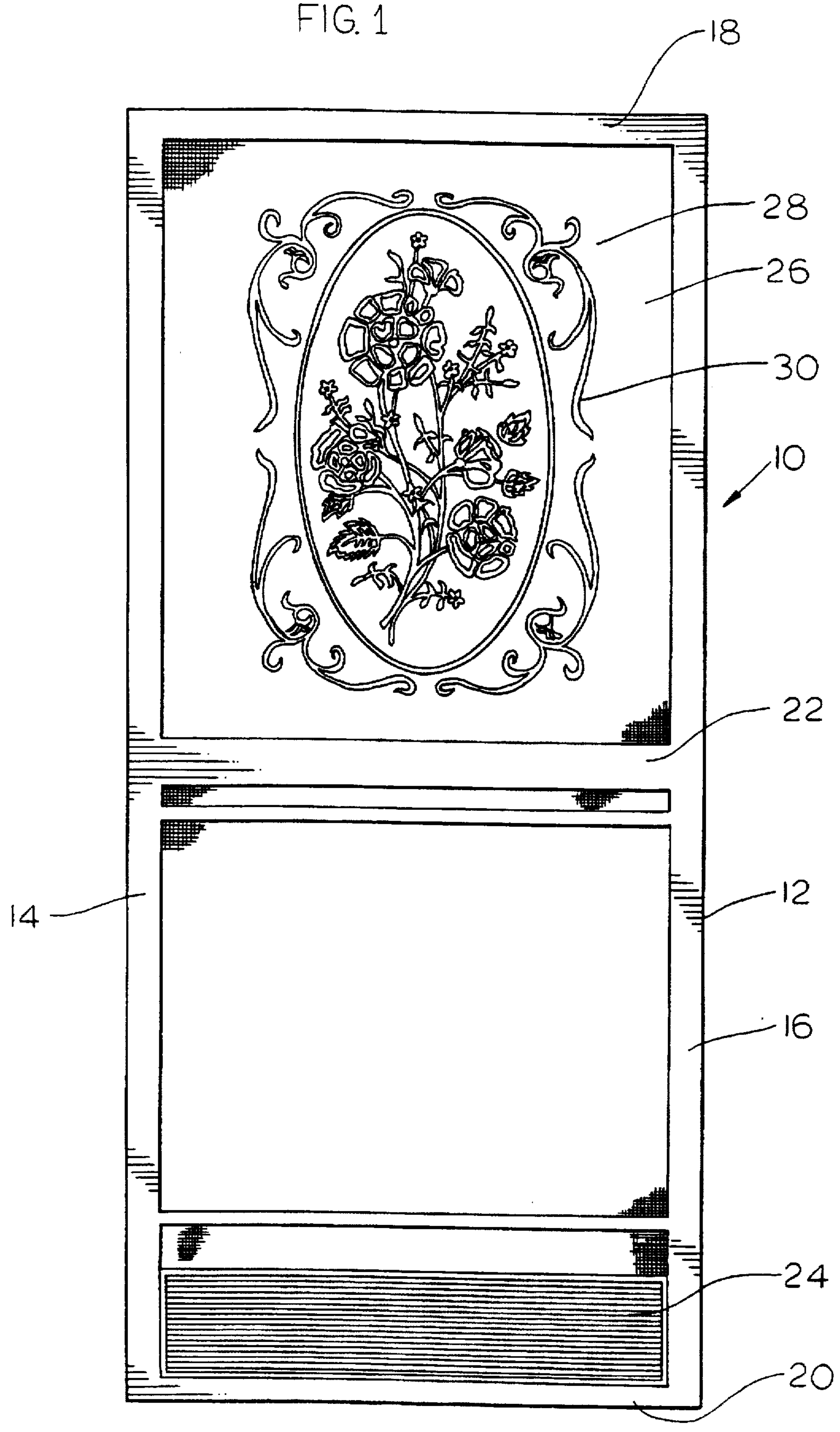
FIG. 1 is a front plant view of a screen door in accordance with the present invention incorporating a decorative panel of large mesh material.

Attention is now directed to FIG. 1 which illustrates a screen door 10 comprised of a substantially rigid frame 12. As depicted, the frame 12 is comprised of vertical stiles 14, 16 bridged by upper and lower horizontal cross members 18, 20. As depicted, the door 10 also includes one or more intermediate cross members 22 connecting the stiles 14, 20. Also depicted is a kick plate 24 which is mounted immediately above the lower horizontal cross member 20.

The frame members define one or more open areas, e.g., 26 which normally accommodates a panel of substantially open (i.e., more than 50% open) mesh material 28 which is characterized by being air permeable and essentially visually transparent. A mesh material typically used for screen door applications is formed of orthogonal fibers, e.g., aluminum or fiber glass, which are spaced substantially uniformly in vertical and horizontal directions to define a matrix of rectangular mesh openings. For example, a mesh material widely used in screen doors employs fibers having a diameter of 0.011 inches with 18 vertical and 16 horizontal fibers per inch. The resulting mesh openings, e.g., approximately 0.05 inch square, are sufficiently small to constitute an effective boundary against flying insects.

The present invention is concerned with forming a decorative pattern 30 on the mesh material 28 to enhance the door's aesthetic appearance and yet not diminish its functionality. In accordance with a preferred embodiment of the invention, the decorative pattern 30 is formed by depositing an essentially planar layer of plastic material on the mesh material 28.

Figure 2:
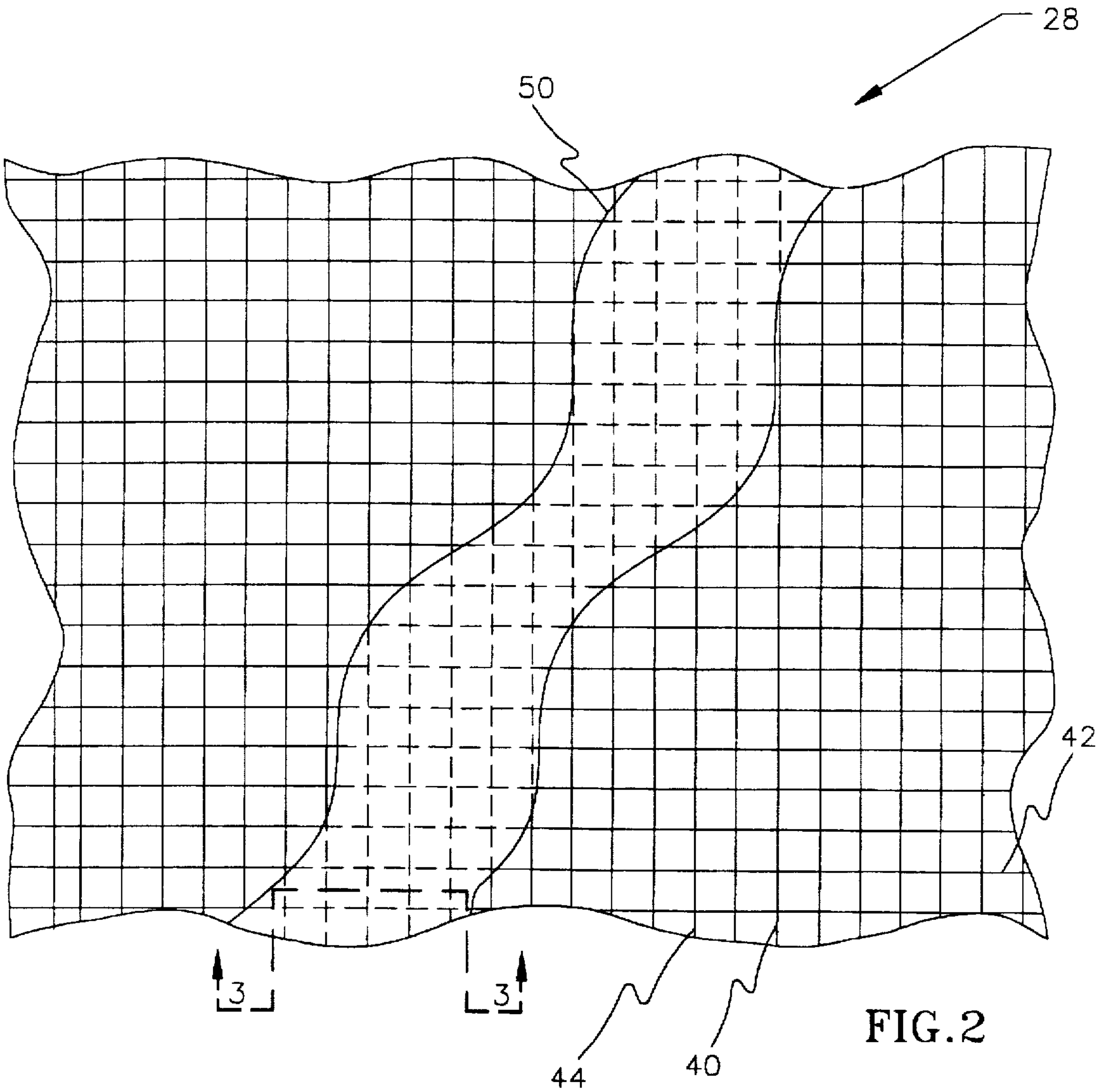
FIG. 2 is an enlarged view showing a typical portion 2—2 of the decorative panel of FIG. 1.

More particularly, with reference to FIG. 2, the mesh material 28 is formed by a plurality of vertical fibers 40 which intersect or cross over horizontal fibers 42. So oriented, the fibers 40, 42 form a matrix of rectangular openings 44. The present invention is concerned with mesh material 28 in which the openings 44 constitute greater than 50% of the area of the material thus providing sufficient air permeability and visual transparency to satisfactorily function in a screen door application.

Figure 3:
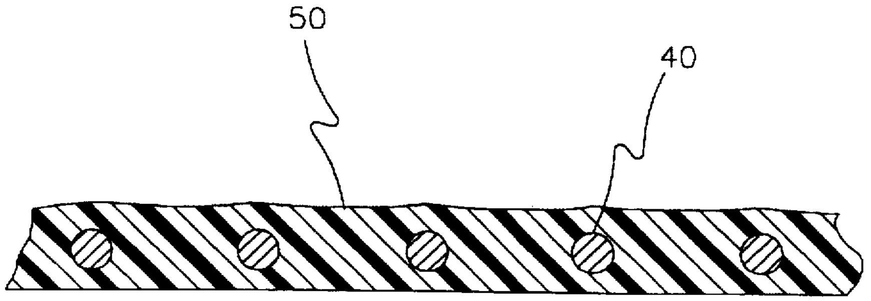
FIG. 3 is a sectional view taken substantially along the plane 3—3 of FIG. 2.

In accordance with the preferred embodiment, an essentially planar layer of plastic material 50 is deposited on the mesh material 28 embedding, at least partially, portions of the fibers 40, 42. The plastic material 50 so deposited forms the decorative pattern 30 depicted in FIG. 1. FIG. 3 is a cross-section taken substantially along the plane 3—3 of FIG. 2 showing the plastic material 50 deposited on the fibers 40. Although the plastic material 50 is opaque and not air permeable, it occupies only a relatively small portion of the mesh material area and thus does not measurably diminish its air permeable and visually transparent characteristics.

Figure 4A:
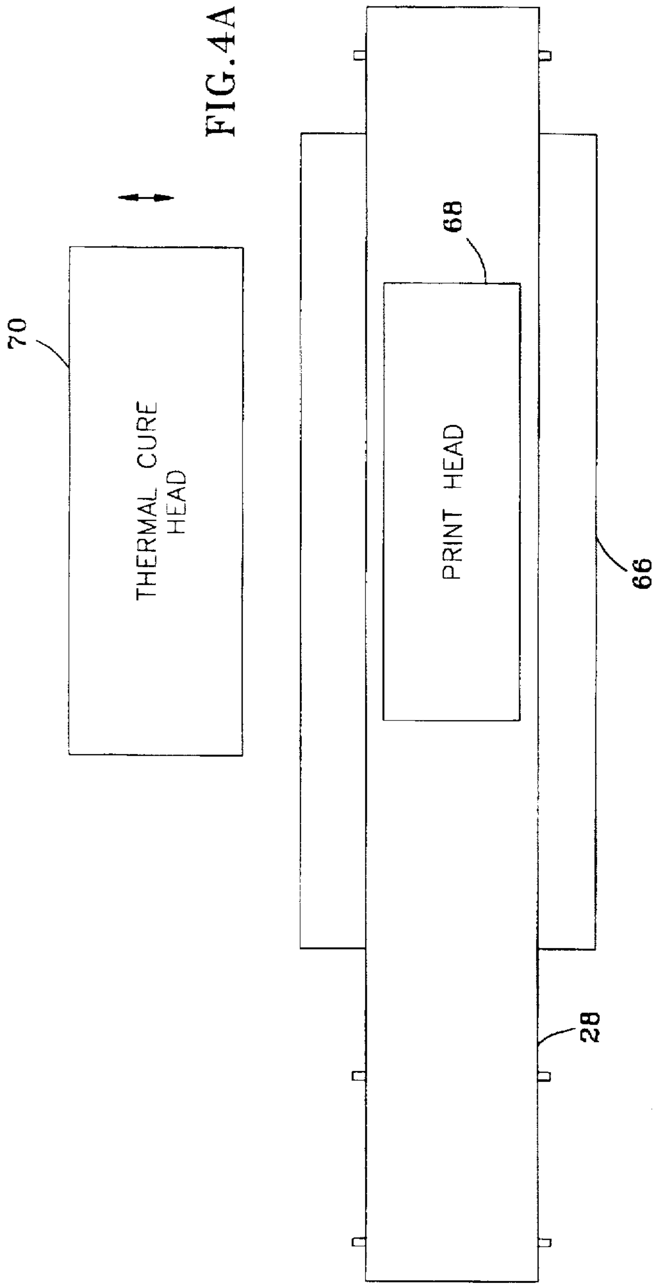
FIGS. 4A and 4B are respectively top plan and side section views schematically representing an apparatus for producing decorative panels in accordance with the invention.
Figure 4B:
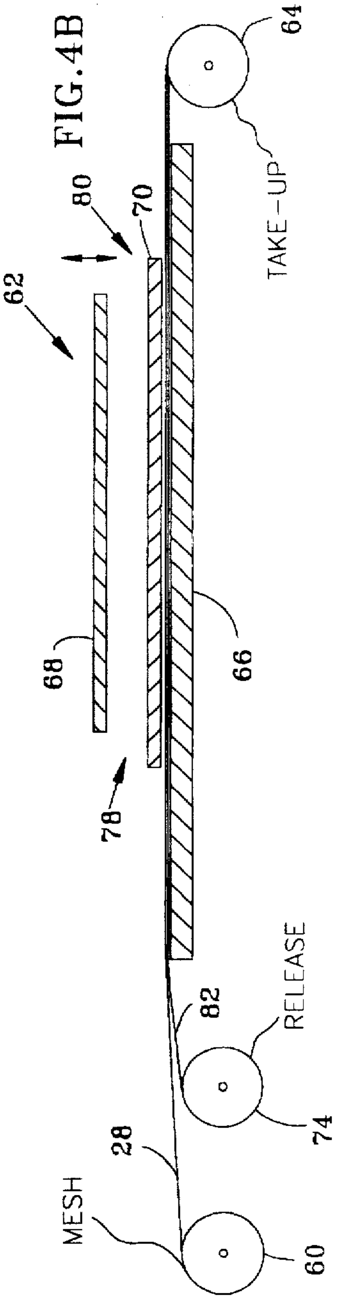

FIGS. 4A and 4B illustrate a preferred apparatus for depositing the plastic material 50 on the mesh material 28. More particularly, FIGS. 4A and 4B depict a supply roll 60 of mesh material 28 positioned to be pulled through a print station 62 by a driven take up roll 64. The print station 62 is essentially comprised of a stationary platen 66, a movable print head 68, and a movable thermal curing head 70. As will be discussed hereinafter, the print head 68 and thermal curing head 70 are sequentially moved into position adjacent the mesh material 28 above the platen 66. FIGS. 4A and 4B also depict a supply roll 74 of a treated smooth surface release material e.g., paper. Note that supply rolls 60 and 74 are mounted proximate to the entrance 78 of print station 62, whereas take up roll 64 is mounted adjacent the exit 80. The release material 82 supplied from roll 74 extends between the mesh material 28 and the platen 66.

Figure 5A:
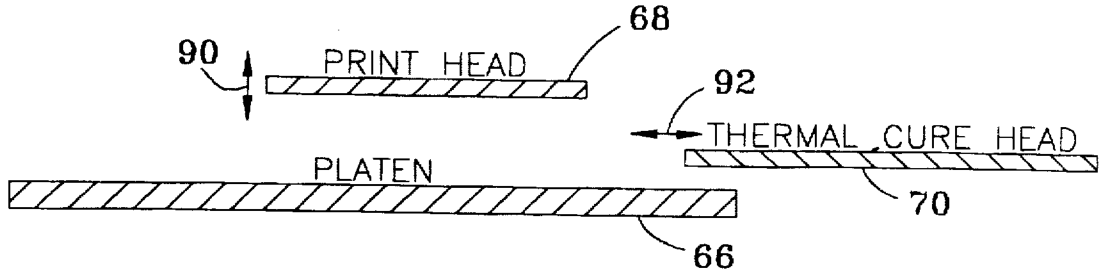
FIGS. 5A, 5B, 5C respectively schematically depict steps employed to manufacture panels in accordance with a preferred embodiment of the invention.

FIG. 5A schematically depicts the print head 68 and thermal cure head 70 in a rest or start position relative to the platen 66. The print head 68 is mounted for movement represented by arrows 90, toward and away from platen 66. Cure head 70 is also mounted for movement, represented by arrows 92 into position adjacent platen 66.

Figure 5B:
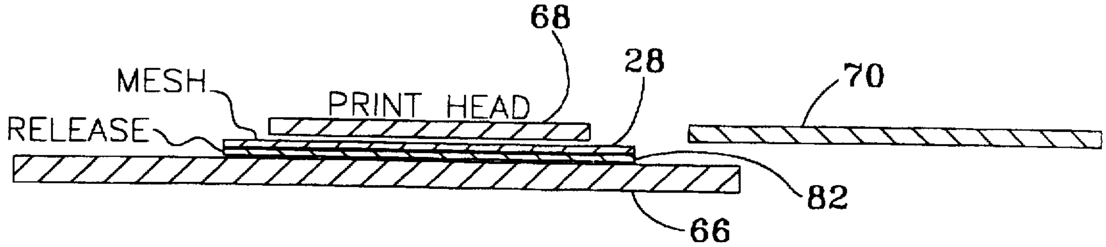

FIG. 5B depicts the print step in which the print head 68 moves close to the platen 66 sandwiching the mesh material 28 and release material 82 therebetween. The print head 68 is substantially conventional and is comprised of a fine printing screen and an opaque stencil. When in the print step depicted in FIG. 5B, a thermal setting plastic ink is dispensed from the print head 68 flooding onto the mesh material 28 and therethrough against the release material 82. Suitable thermal setting plastic inks are readily commercially available as are printing systems for controllably dispensing the plastic ink through the print head 68.

After the plastic ink is deposited on to the mesh material 28 and against the release material 82, as represented in FIG. 5B, the print head is moved away from platen 66 and the thermal cure head 70 moves into position above the platen 66. The thermal cure head then applies sufficient heat to set the deposited plastic material 50. Thereafter, the apparatus is returned to its rest or start position depicted in FIG. 5A.

As shown in FIG. 4B, the mesh material 28 and release material 82 are preferably taken up on the same roll 64, although of course separate take-up rolls could be used. In any event, the release material and mesh material are preferably peeled apart prior to final assembly into a door 10.

In an exemplary preferred embodiment, the print area defined by the print head 68 is approximately 3 feet wide and 7 feet long. The thermal cure head is preferably slightly larger to assure sufficient heating for setting the plastic ink. Different types of ink can be used, but a preferred form comprises Willflex Gold TF #85570 and White 1C714 HPLF, a plastic screen printing ink marketed by Flexible Products Company of Marietta Ga. The plastic material formed on the mesh material 28 typically has a thickness on the order of 1/16 inch.

Figure 5C:
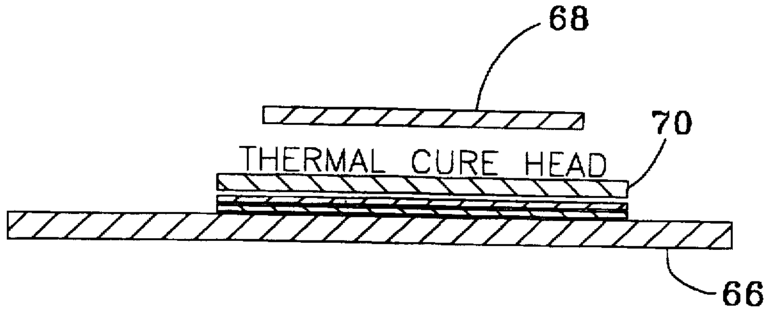

Although only a single print station has been shown in FIGS. 4 and 5, it is pointed out that multiple print stations could be provided to simultaneously print along multiple regions of the mesh material web. Alternatively, the multiple print stations can be used to respectively apply different colors of plastic ink to produce multiple color decorative patterns.

From the foregoing, it should be appreciated that applicants have disclosed herein a decorative panel suitable for use in a screen door and the like which aesthetically enhances the end product without measurably diminishing its air permeable and visually transparent characteristics. It is recognized that various modifications to the disclosed apparatus and method will occur to those skilled in the art and it is intended that any such modifications, variations, and equivalents be encompassed by the scope of the appended claims.

We claim:

1. A method of manufacturing a decorative, air permeable, visually transparent panel suitable for use in screen doors, windows, and similar structures comprising the steps of:

- positioning a sheet of intersecting fibers defining at least a 50% open mesh between a print head and a platen;
- positioning a smooth surface release sheet between said mesh sheet and said platen;
- operating said print head to deposit a plastic layer on said mesh sheet, and therethrough to said release sheet, to form a decorative pattern; and
- peeling said release sheet away from said mesh sheet.

2. The method of claim 1 wherein said print head is operated to flow thermal setting plastic ink onto said mesh sheet and therethrough to said release sheet; and

- applying heat to said plastic ink to form a planar layer of plastic material at least partially surrounding portions of multiple ones of said fibers.

3. The method of claim 1 further including the step of mounting said sheet in an open area of a screen door frame.

4. A method of manufacturing a screen door having a decorative, air permeable, visually transparent panel comprising the steps of:

- feeding a web of mesh material of intersecting fibers defining at least a 50% open mesh along a path between a print head and a platen;
- feeding a web of release material having a smooth surface along a path between said mesh material web and said platen;
- periodically stopping movement of said mesh material web and release material web;
- operating said print head while said movement is stopped to deposit a plastic layer on said mesh material web, and therethrough to said release material web, to form a decorative pattern;
- mounting a portion of said mesh material web in an open area of a screen door frame; and
- peeling release material from said portion of mesh material.

5. The method of claim 1 wherein said print head is operated to flow thermal setting plastic ink onto said mesh sheet and therethrough to said release sheet; and

- applying heat to said plastic ink to form a planar layer of plastic material at least partially surrounding portions of multiple ones of said fibers.

6. The method of claim 4 including the further step of winding said web of mesh material onto a take-up roll.

* * * * *